May 12, 1959 W. HERRSCHAFT 2,886,359
ROD JOINTS
Filed Sept. 8, 1954 2 Sheets-Sheet 1
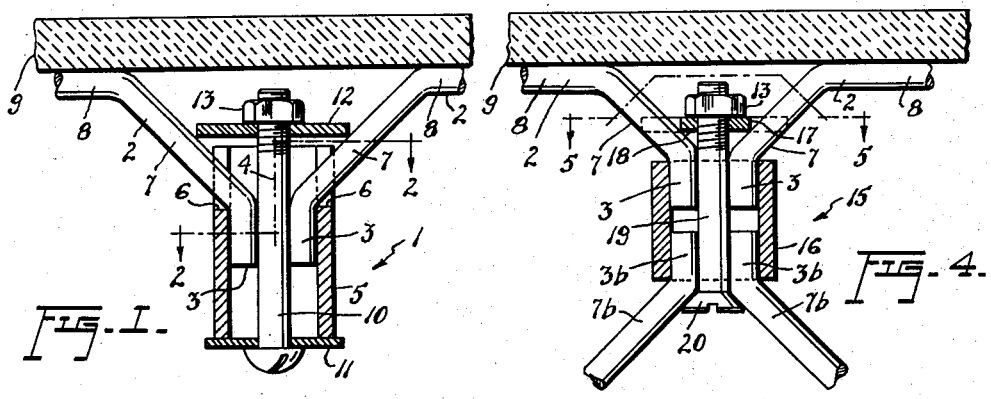
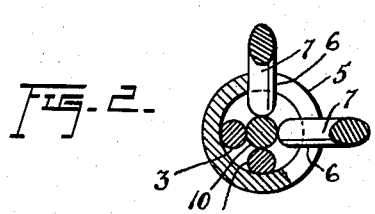
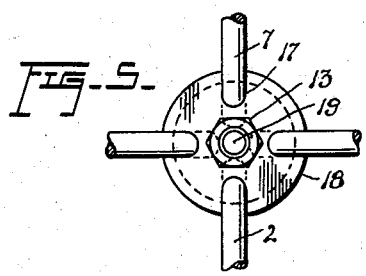
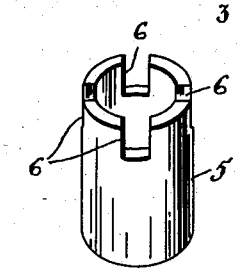
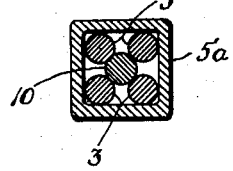
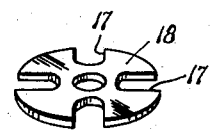
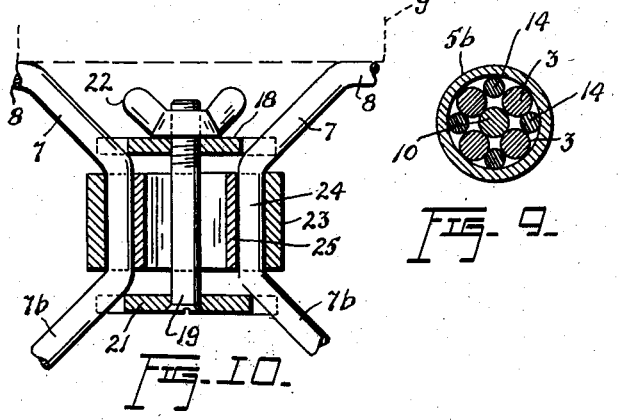
INVENTOR
William Herrschaft May 12, 1959 W. HERRSCHAFT 2,886,359
ROD JOINTS Filed Sept. 8, 1954 2 Sheets-Sheet 2

INVENTOR
William Herrschaft

United States Patent Office 2,886,359
Patented May 12, 1959

2,886,359

ROD JOINTS

William Herrschaft, New York, N.Y.

Application September 8, 1954, Serial No. 454,652

1 Claim. (Cl. 287—54)

This invention relates to new and useful improvements and structural refinements in rod joints, and more particularly, the invention concerns itself with highly versatile means for separably connecting together a plurality of rods or bars.

The principal object of the invention is to provide a joint of this nature whereby such rods or bars may be firmly joined and held, such as for example, in the leg structure of a stand or a table, the joint being of very simple construction and adapted to be assembled or disassembled without any need for mechanical skill.

With the above more important objects and features in view and such other objects and features as may become apparent as this specification proceeds, the invention resides in the arrangement of parts and details of construction, substantially as shown in the accompanying drawings wherein like characters of reference are used to designate like parts and wherein:

Figure 1 is a vertical sectional view illustrating one form of the invention;

Figure 2 is a sectional detail, taken substantially in the plane of the line 2—2 in Figure 1;

Figure 3 is a perspective view of a sleeve used in the joint;

Figure 4 is a vertical sectional view illustrating another form of the invention;

Figure 5 is a sectional detail, taken substantially in the plane of the line 5—5 in Figure 4;

Figure 6 is a perspective view of a keeper washer used in the form of the invention shown in Figures 4 and 5;

Figure 7 is a horizontal sectional view of another modified form;

Figure 8 is a horizontal sectional view of another modified form;

Figure 9 is a horizontal sectional view of another modified form;

Figure 10 is a vertical sectional view of another modified form of the invention;

Figure 11:
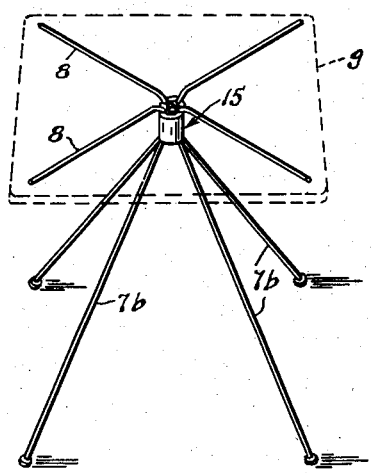
Figure 11 is a perspective view showing one example of the use of the invention.

With reference now to the accompanying drawings in detail, in particular to Figures 1, 2 and 3, the rod joint is designated generally by the numeral 1 and is used for connecting together plurality of rods 2 having parallel end portions 3 so disposed that they are spaced radially outwardly from a common axis 4.

The joint embodies in its construction a substantially tubular sleeve 5 having the rod portions 3 disposed therein, it being noted that one end portion of the sleeve 5 is provided with notches 6 affording keeper seats for laterally extending portions 7 of the rods 2. By virtue of these keeper seats the rods are prevented from turning or rotating in the sleeve and horizontal extensions 8 of the rods are held in a fixed radiating relation from the joint, so that they may be effectively used to support an article such as for example a tray or table top 9.

The joint is held in an assembled position by a clamping screw 10 which extends axially through the sleeve 5 in contacting relation with the rod portions 3. One end of the screw 10 is provided with a washer 11 which abuts the lower end of the sleeve, while the other end of the screw carries another washer 12 which is in a clamping engagement with the lateral portions 7 of the rods. Thus, when a nut 13 on the screw 10 is tightened, the joint will be firmly held in its assembled form.

As already stated, the sleeve 5 is substantially tubular, that is, circular in cross-section. However, if desired, a polygonal sleeve may be used as shown at 5a in Figure 7, wherein the rod portions 3 are disposed in the respective corners of the sleeve.

Also, it will be noted that the rod portions 3 may be mutually spaced apart in the sleeve as shown in Figures 2 and 7, or they may be in a juxtaposed, contacting relation as shown in Figure 8 wherein the rod portions 3a are of a relatively small diameter with respect to the sleeve 5b.

In the event that the rod portions are spaced apart and any tendency exists for them to rock or shift out of vertical positions in the sleeve, relatively short, rod-shaped fillers or spacers 14 may be inserted between the rods as illustrated in Figure 9 so that the rod portions, spacers, clamping screw and sleeve are in contact.

With reference now to the accompanying Figures 4, 5 and 6, the joint assembly 15 shown herein utilizes a sleeve 16 which may be somewhat shorter than the sleeve 5 since the notches 6 are omitted. However, notches 17 are provided in the keeper washer 18 on the clamping screw 19, so that when the screw is tightened, the notches 17 of the washer 18 receive therein the lateral portions 7 of the rods 2 and the rods are prevented from turning in the sleeve.

The joint 15 also embodies another variation, namely, the provision of two groups of the rod portions 3 and 3b, the first group extending into the sleeve from the top and the second group from the bottom. As already stated, the lateral portions 7 of the rods in the first group are clampingly engaged by the washer 18, while the lateral portions 7b of the rods in the second group are similarly engaged by the tapered head 20 of the screw 19. In a somewhat modified form illustrated in Figure 10, a keeper washer 21, similar to the washer 18, is used to clamp the rod portions 7b in place of the head of the screw and a wing nut 22 may be used in place of a plain nut on the clamping screw so that the use of tools is not necessary when the device is assembled or disassembled.

Figure 12:
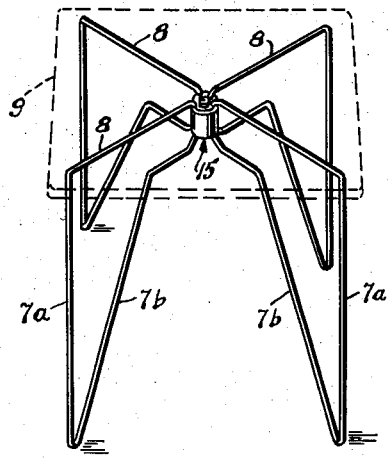
Figure 12 is a perspective view showing another example of use.

As is exemplified in Figure 11, the extensions 8 of the joined rods may be used to support a table top 9, or the like, while the rod portions 7b may form the legs. In such an arrangement the rods above the joint 15 are separate from the rods below the joint. Alternatively, as shown in Figure 12, the rods above and below the joint may be formed integrally from same pieces of wire, wherein the intermediate rod portions 7a connect together the rod portions 8 and 7b and also serve to reinforce the top and the legs.

As another alternative form of construction, the rod portions 8 and 7b may be connected together inside the sleeve 23 by integral intermediate portions 24 which take place of the aforementioned portions 3 and 3b. In this arrangement the intermediate portions of the rods pass through the sleeve and, as will be noted in Figure 10, the sleeve is sufficiently large in diameter to allow the laterally angulated rod portions 7, 7b to pass through the sleeve when the joint is assembled or disassembled. To prevent the rods from shifting radially inwardly in the sleeve, a tubular insert or bushing 25 is removably positioned in the sleeve as shown.

Figure 13:
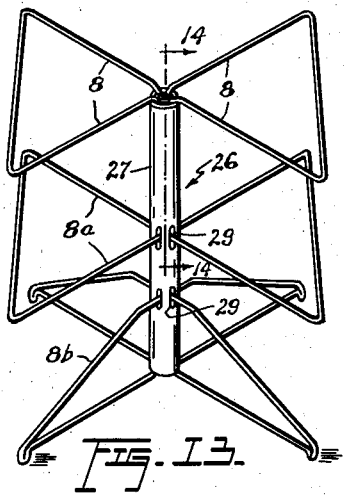
Figure 13 is a perspective view showing another example of use.
Figure 14:
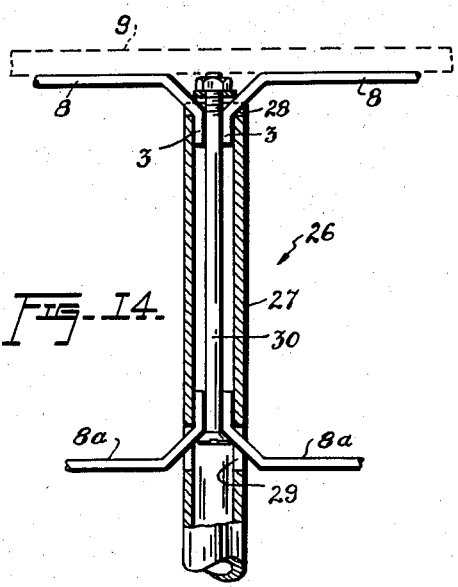
Figure 14 is a sectional detail, taken substantially in the plane of the line 14—14 in Figure 13.

With reference now to the embodiment of the invention shown in Figures 13 and 14, the rod joint 26 herein is vertically elongated to the extent that the sleeve thereof assumes the form of a pipe or tube 27 having keeper notches 28 at either or both ends thereof and provided at longitudinally spaced points with sets of slots 29. The tube 27 accommodates sets of rods 8, 8a, 8b, the rods 8 being extended through the notches 28 while the rods 8a, 8b are extended through the slots 29 into the tube for clamping purposes. Thus, the rods 8, 8a and 8b may be disposed at different levels to supports trays, etc., in a vertically spaced relation and the rods at the bottom may be suitably angulated to afford supporting legs for the stand thus constructed. As will be noted, the clamping screw 30 is of sufficient length to extend from the rods on one level to those at the next.

Figure 15:
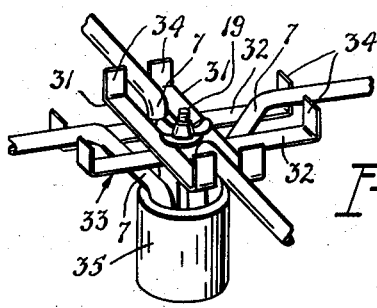
Figure 15 is a fragmentary perspective view, illustrating a modified form of the rod locking means.

Finally, Figure 15 illustrates a modified form of means for locking the rods against rotation in the sleeve, which means may be used in substitution for the notched sleeve 5 of Figure 1 or the notched washer 18 of Figure 4. The modified locking means consists of pairs of spaced, parallel straps 31, 32 which are secured together in crossing relation and form what may be called a spider 33 which is adapted to be seated between the angulated portions 7 of the rods so that the clamping screw 19 extends through a space defined at the center of the spider by the spaced, crossed straps. The straps 31, 32 have upturned end portions 34 which, in each pair, engage the opposite sides of the respective rod portions 7 and thereby lock the rods in a predetermined angular relationship and against rotation in the sleeve 35.

While in the foregoing there have been described and shown the preferred embodiments of the invention, various modifications may become apparent to those skilled in the art to which the invention relates. Accordingly, it is not desired to limit the invention to this disclosure and various modifications may be restored to, such as may lie within the spirit and scope of the appended claim.

What is claimed as new is:

The combination of a plurality of rods having straight parallel portions spaced radially outwardly from a common axis and lateral portions extending outwardly from angulations at the ends of said parallel portions, and a rod joint comprising a sleeve provided intermediate its ends with a plurality of circumferentially spaced openings, the angulations of said rods extending inwardly through said openings and the parallel portions of said rods being disposed within the intermediate portion of the sleeve, a clamping screw coaxial with the stated common axis and extending axially in said sleeve, said parallel portions of said rods having their full length in supporting engagement with said screw and with the inner surface of said sleeve, and clamping means provided on said screw and engaging the angulated portions of said rods to clamp the same against edges of said openings in a direction parallel to the axis of said screw.

References Cited in the file of this patent

UNITED STATES PATENTS

| | | |
|---|---|---|
| 904,758 | Cropp | Nov. 24, 1908 |
| 948,537 | Wilson | Feb. 8, 1910 |
| 1,015,183 | Hering | Jan. 16, 1912 |
| 1,371,263 | Reed | Mar. 15, 1921 |
| 1,591,110 | Willson | July 6, 1926 |
| 1,885,635 | Schweitzer | Nov. 1, 1932 |